US008645683B1

(12) United States Patent
Emigh

(10) Patent No.: US 8,645,683 B1
(45) Date of Patent: Feb. 4, 2014

(54) VERIFIED NAVIGATION

(76) Inventor: Aaron T. Emigh, Incline Village, NV (US)

( * ) Notice: Subject to any disclaimer, the term of this patent is extended or adjusted under 35 U.S.C. 154(b) by 1397 days.

(21) Appl. No.: 11/502,906

(22) Filed: Aug. 11, 2006

Related U.S. Application Data

(60) Provisional application No. 60/707,566, filed on Aug. 11, 2005.

(51) Int. Cl.
*G06F 21/00* (2013.01)

(52) U.S. Cl.
USPC ........... 713/155; 709/218; 709/229; 709/230; 715/205; 715/239; 715/738; 726/22; 726/26

(58) Field of Classification Search
USPC .................................................. 713/155, 176
See application file for complete search history.

(56) References Cited

U.S. PATENT DOCUMENTS

| | | | |
|---|---|---|---|
| 5,708,780 A | 1/1998 | Levergood | |
| 5,832,208 A | 11/1998 | Chen et al. | |
| 6,009,459 A | 12/1999 | Belfiore et al. | |
| 6,065,021 A | 5/2000 | George | |
| 6,092,194 A | 7/2000 | Touboul | |
| 6,421,709 B1 | 7/2002 | McCormick et al. | |
| 6,615,242 B1 | 9/2003 | Riemers | |
| 6,697,950 B1 | 2/2004 | Ko | |
| 6,757,830 B1 | 6/2004 | Tarbotton et al. | |
| 6,779,178 B1 | 8/2004 | Lloyd et al. | |
| 6,792,536 B1 | 9/2004 | Teppler | |
| 6,910,077 B2 | 6/2005 | Najork | |
| 7,100,049 B2 | 8/2006 | Gasparini et al. | |
| 7,114,147 B2 | 9/2006 | Ballantyne et al. | |
| 7,340,533 B2 | 3/2008 | Murtza et al. | |
| 7,401,115 B1 | 7/2008 | Arsenault | |
| 7,451,487 B2 | 11/2008 | Oliver et al. | |
| 7,657,838 B2 | 2/2010 | Daniell et al. | |
| 7,698,442 B1 * | 4/2010 | Krishnamurthy et al. | 709/229 |
| 7,769,820 B1 * | 8/2010 | Spies et al. | 709/218 |
| 2002/0111996 A1 | 8/2002 | Jones et al. | |
| 2002/0112008 A1 | 8/2002 | Christenson et al. | |
| 2002/0169954 A1 | 11/2002 | Bandini et al. | |
| 2003/0110293 A1 | 6/2003 | Friedman et al. | |
| 2004/0078422 A1 | 4/2004 | Toomey | |
| 2004/0088433 A1 | 5/2004 | Kaler et al. | |
| 2004/0111673 A1 | 6/2004 | Bowman et al. | |
| 2004/0123157 A1 * | 6/2004 | Alagna et al. | 713/201 |
| 2004/0199762 A1 | 10/2004 | Carlson et al. | |
| 2005/0010814 A1 * | 1/2005 | Lim et al. | 713/201 |
| 2005/0021997 A1 * | 1/2005 | Beynon et al. | 713/200 |

(Continued)

OTHER PUBLICATIONS http://www.cs.ucsb.edu/~chris/research/doc/cj06_phish.pdf|Protecting Users Against Phishing Attacks|Kirda et al.|2005|pp. 1-8.*

(Continued)

*Primary Examiner* — Mahfuzur Rahman

(57) ABSTRACT

In some embodiments, techniques for computer security comprise detecting an attempt of a traversal associated with a link and a link destination, receiving an intended destination, comparing the intended destination and the link destination, and interfering with the traversal, if it is determined that the intended destination is substantially dissimilar to the link destination. In some embodiments, techniques for computer security comprise detecting a link associated with a document, determining a second link associated with a predetermined address and with the link, and rewriting the link including the second link.

19 Claims, 8 Drawing Sheets

(56) References Cited

U.S. PATENT DOCUMENTS

| | | |
|---|---|---|
| 2005/0022008 A1 | 1/2005 | Goodman |
| 2005/0044242 A1 | 2/2005 | Stevens et al. |
| 2005/0050150 A1 | 3/2005 | Dinkin |
| 2005/0154601 A1 | 7/2005 | Halpern et al. |
| 2006/0053293 A1* | 3/2006 | Zager et al. ............... 713/176 |
| 2006/0070126 A1* | 3/2006 | Grynberg ..................... 726/22 |
| 2006/0101334 A1* | 5/2006 | Liao et al. .................... 715/523 |
| 2006/0101514 A1* | 5/2006 | Milener et al. ................ 726/22 |
| 2006/0123464 A1* | 6/2006 | Goodman et al. ............... 726/2 |
| 2006/0206571 A1* | 9/2006 | Kuwahara .................... 709/206 |
| 2006/0265508 A1* | 11/2006 | Angel et al. ................. 709/230 |
| 2006/0271861 A1* | 11/2006 | Yolleck et al. ............... 715/760 |
| 2007/0005984 A1* | 1/2007 | Florencio et al. ............. 713/178 |
| 2007/0101423 A1 | 5/2007 | Oliver et al. |
| 2008/0172382 A1* | 7/2008 | Prettejohn ..................... 707/6 |
| 2009/0055642 A1* | 2/2009 | Myers et al. ................. 713/155 |

OTHER PUBLICATIONS

Chou et al, "Client-side Defense Against Web-Based Identity Theft." 11th Annual Network and Distributed System Security Symposium (NDSS '04), San Diego, Feb. 2004.

Min Wu et al, "Users are not Dependable: How to make security indicators that protect them better." Presentation given at the first TIPPI workshop, Jun. 13, 2005.

* cited by examiner

VERIFIED NAVIGATION

CROSS REFERENCE TO RELATED APPLICATIONS

This application claims priority to U.S. Provisional Patent Application No. 60/707,566, entitled TRUSTED PATH AND ANTI-PHISHING, filed Aug. 11, 2005, which is incorporated herein by reference for all purposes.

FIELD OF THE INVENTION

The present invention relates generally to the area of computer security. More specifically, techniques for the secure entry of data are disclosed.

BACKGROUND OF THE INVENTION

Electronic documents such as web pages, emails and instant messages often contain links that can be used to navigate to other documents, such as web pages.

Such links frequently go to a location unintended by the user, such as a phishing site. In many cases, such as in the case of "phishing" messages or web sites hosting malicious content (either intentionally or inadvertently), such a location may be associated with malicious document, which can cause harm such as installation of malicious software or theft of personal information.

Present technologies for preventing phishing include interception of a phishing message, prevention of site spoofing, or detection of navigation to a malicious site. However, no current filter is effective against all phishing messages, sites can be spoofed despite the current countermeasures, and detection of malicious site navigation is error-prone. Moreover, users tend to ignore confirmation screens and automatically approve most actions that are called to their attention.

It would be useful to be able to ensure that traversal of a link resulted in navigation to an intended location.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
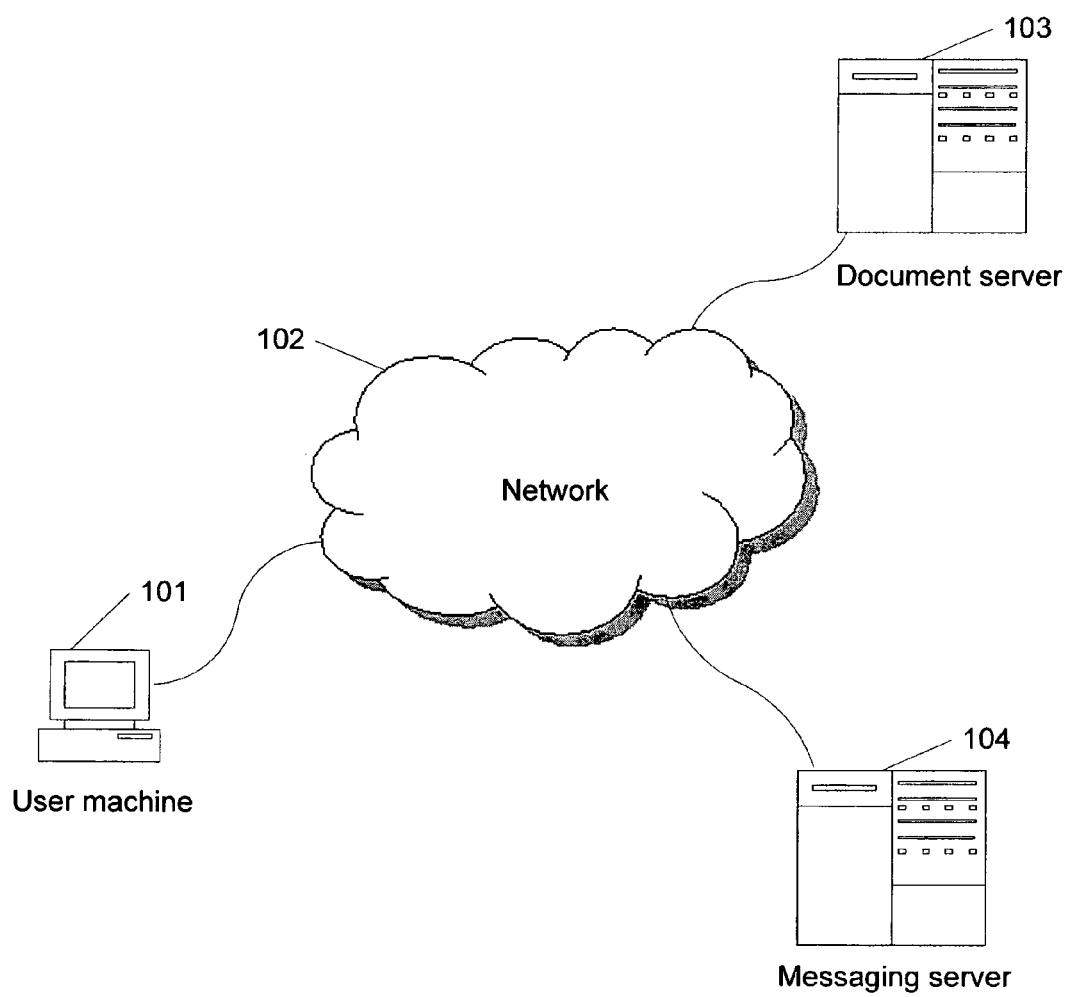
FIG. 1 is a diagram of a system for navigation enabling verification, according to some embodiments.

FIG. 1 is a diagram of a system for navigation enabling verification, according to some embodiments. In this example, a user machine 101 may be connected to a network 102. A user machine 101 may be any user-operated device capable of performing programmed information processing. Examples of a user machine include a personal computer, a PDA, an internet appliance, and a cell phone. In some embodiments, a user machine 101 may receive a document through the network 102 from a document server 103. Examples of a document include a web page, a document in a page description language such as a PDF, a word processing document, a database document and a spreadsheet. A user machine 101 may receive a message via a network 102 from a messaging server 104. A message refers herein to any electronic communication that may be presented to a user. Examples of a message include an email, an instant message, an SMS text message, and an RSS, Atom, or Bluetooth message.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet.

A document server 103 may be connected to the network 102. The document server 103 may be any entity capable of providing a document, such as a web server that provides a document through a protocol such as HTTP. The document server 103 may provide a document that includes an embedded request for secure data entry. A document refers herein to any data that may be referenced by an address, including a file on a computer filesystem, an entry in a database table, a web page, and dynamically generated data provided by a server such as an HTTP server.

A messaging server 104, such as a Mail Transfer Agent (MTA), POP or IMAP server, or instant messaging server, may be connected to the network 102. The messaging server 104 may provide a message to the user machine 101. In some embodiments, a messaging server 104 and user machine 101 may be associated with an enterprise network such as a LAN or virtual private network.

Figure 2:
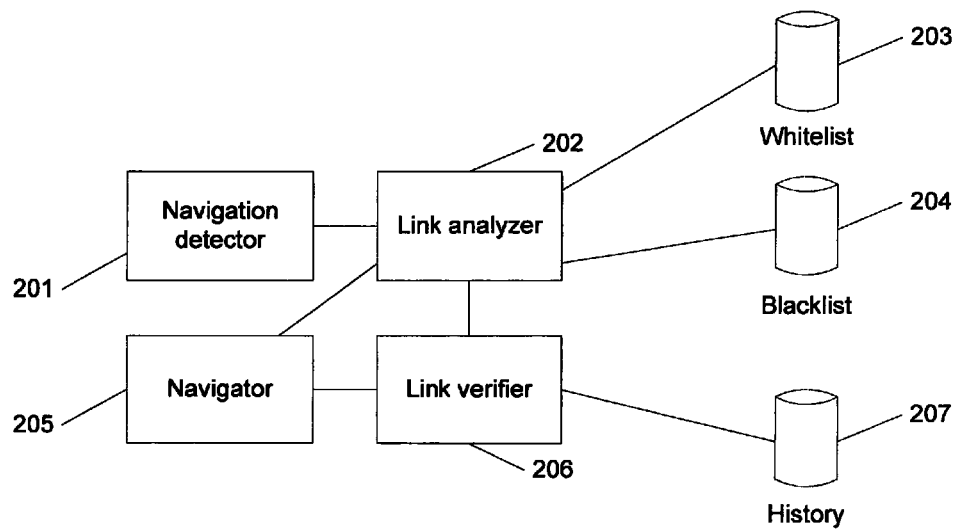
FIG. 2 is a diagram of a system for verifying navigation, according to some embodiments.

FIG. 2 is a diagram of a system for verifying navigation, according to some embodiments. In this example, a navigation detector 201 detects a navigation action, such as a user clicking on a link in a message or other document. A link analyzer 202 determines whether a link is to be processed as suspicious. In various embodiments, a link analyzer 202 may process all links as suspicious, or may process only links with (or lacking) certain properties as suspicious. A link analyzer 202 may employ various external data sources such as a whitelist 203 and/or blacklist 204 to help determine whether a link is to be processed as suspicious.

A link verifier 206 triggers verification of the intended destination of a suspicious link against the destination contained in the link. A link verifier 206 may use historical information 207 in such its verification, for example by presenting a menu of possible intended destinations including one or more historically used destinations. A navigator 205 permits or interferes with navigation to a location associated with the link, based on suspiciousness and/or the result of verification.

Further details of the operation of this FIG. 2 are discussed in conjunction with the remaining Figures.

Figure 3:
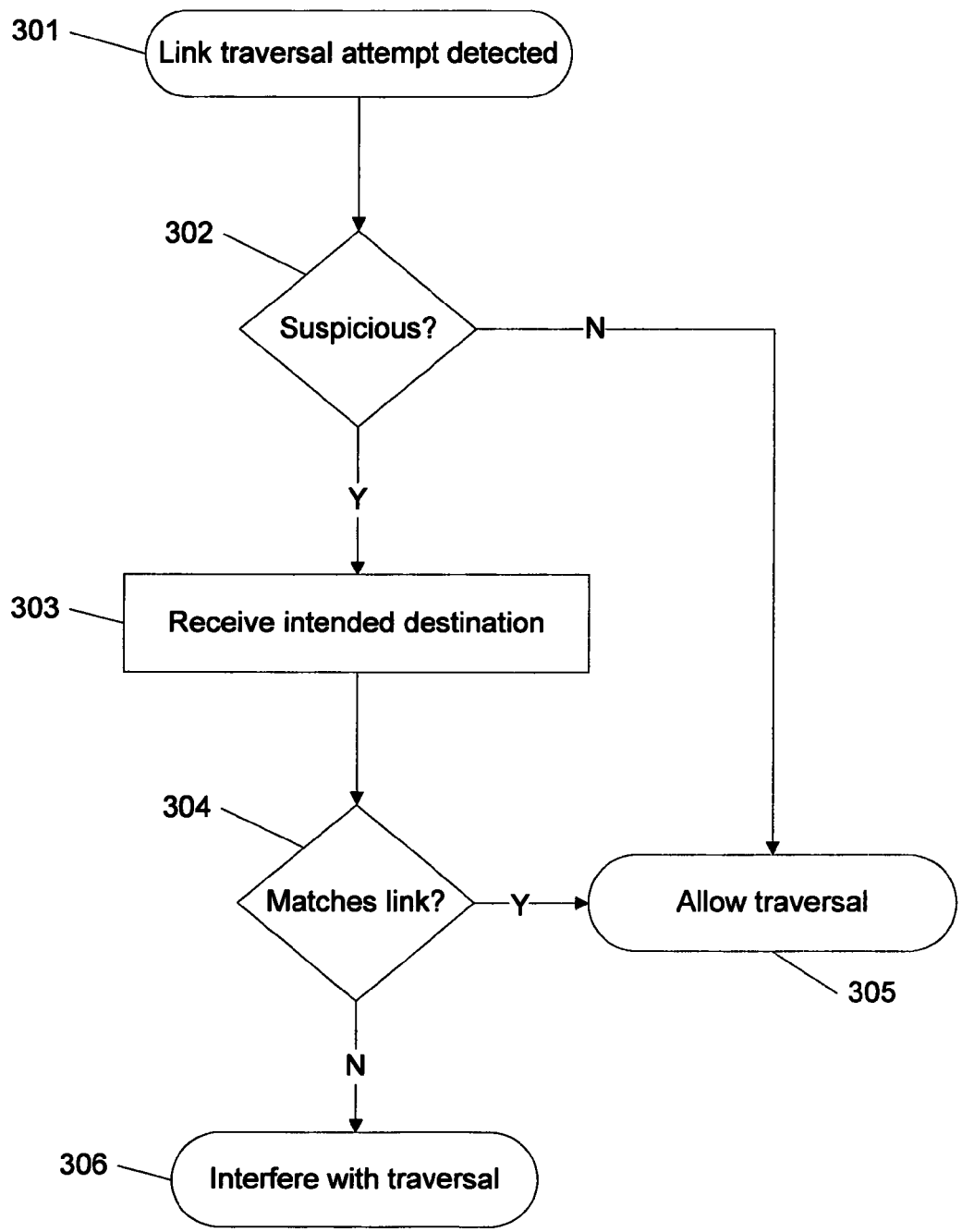
FIG. 3 is a flow diagram of a method for verifying navigation, according to some embodiments.

FIG. 3 is a flow diagram of a method for verifying navigation, according to some embodiments. In this example, an attempt to traverse a link may be detected (301). An example of detecting an attempt to traverse a link is to receive an event indicating that a user has selected the link, for example by clicking on a hyperlink with a pointing device such as a mouse. In some embodiments, a link may be associated with a document such as an email, instant message, SMS message or web page.

In some embodiments, detecting an attempt to traverse a link may include receiving a navigation event in a document browser such as a web browser, for example as a result of hooking an event handler corresponding to the navigation event. In the example of Microsoft Internet Explorer, detecting that an attempt to traverse a link has been made may include receiving a BeforeNavigate2 event. In such a scenario, the un argument may be evaluated to determine a link associated with an attempted traversal.

It may be determined whether the link is suspicious (302). In some embodiments, all links may be considered suspicious. Other examples of determining whether a link is suspicious include determining that a link is obfuscated, for example that a link contains suspicious UTF-8 encoded characters; determining that a link is associated with text that is substantially a well-formed URL that is different than the actual link destination; determining that a link includes an embedded username and/or password; determining that a link is associated with an image map with an actual destination substantially different than an HREF associated with the image map; and determining that a link is associated with a message such as an email that is suspicious, for example because a message filter has determined that it is likely to be spam or phish, or because the message is not authenticated. Examples of message authentication include an S/MIME signature, DKIM, and SPF/Sender-ID/SIDF.

Other examples of determining whether a link is suspicious include determining whether a link destination is associated with a site substantially different than a site associated with a document containing the link, and determining whether a link destination is not associated with a set of visited, recently visited and/or frequently visited sites.

In some embodiments, determining whether a link is suspicious may include consulting a whitelist, and considering the link unsuspicious if the link is associated with the whitelist. An example of a link associated with a whitelist is a link matching a whitelist entry either exactly or approximately, for example matching in domain and/or subdomain(s).

In some embodiments, determining whether a link is suspicious may include consulting a blacklist, such as a static or dynamically updated blacklist, and considering the link suspicious or banning navigation to the link altogether if the link is associated with the blacklist. An example of a link associated with a blacklist is a link matching a blacklist entry either exactly or approximately, for example matching in domain and/or subdomain(s).

If it is determined that the link is not suspicious (302), then in this example the link traversal is allowed (305).

If it is determined that the link is suspicious (302), then in this example an intended destination is received (303). One example of receiving an intended destination is to prompt for the input of an intended destination and receive an input, such as a name, complete or partial domain name, or a site name, typed into a text box. Another example of receiving an intended destination is to present at least two candidate destinations and receive a selection, for example as discussed in conjunction with FIG. 4.

It may be determined whether the intended destination matches a destination associated with the link (304). An example of determining whether the intended destination matches a destination associated with the link is to perform a string comparison. Another example is to determine whether an element of an intended destination, such as a domain and/or subdomain, matches a corresponding element of a destination associated with the link.

If it is determined that the intended destination matches a destination associated with the link (304), then in this example link traversal is allowed (305). If it is determined that the intended destination does not match a destination associated with the link (304), then in this example link traversal is interfered with (306). Examples of interfering with link traversal include not traversing the link, and displaying a user interface element, which may include a warning message and/or user-selectable options such as options to report a phishing attempt, traverse the link, and/or not traverse the link. Another example of interfering with link traversal is to require re-verification.

An illustrative example of an application of the technique of this FIG. 3 is to intercept a user's clicks on links in an email, and to verify that the user intended to visit any suspicious locations to which he or she would be navigating were the link to be traversed.

Figure 4:
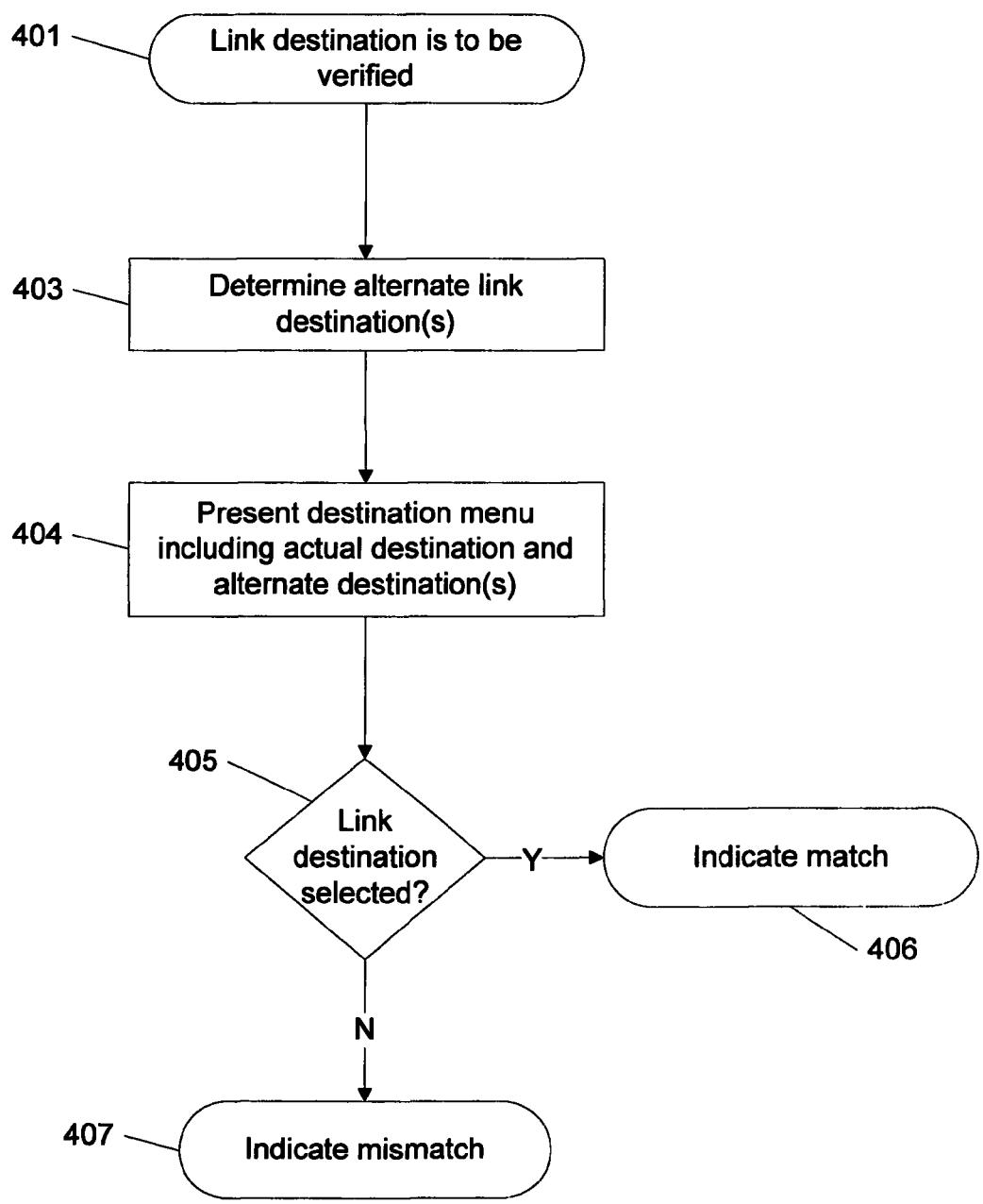
FIG. 4 is a flow diagram of a method for selecting an intended destination, according to some embodiments.

FIG. 4 is a flow diagram of a method for selecting an intended destination, according to some embodiments. In this example, a link destination is to be verified (401). An example of a context in which a link destination is to be verified is that the user has attempted to traverse an associated link, and optionally that the link was determined to be suspicious.

One or more alternate link destinations may be determined (403). An alternate link destination refers herein to a location that corresponds to a site other than the link destination, for example a location that is believed to correspond to a legitimate site. In various embodiments, an alternate link destination may be predetermined, or may be associated with a location that a user has previously visited.

In some embodiments, an alternate link destination may be selected from among predetermined and/or previously visited destinations based on closeness to the actual link destination, for example by selecting an alternate link destination that is close to the actual link destination. Examples of determining the closeness of two destinations include determining that one destination is a substring of another, selecting a destination with a relatively long common substring, prefix or suffix in common with the actual destination, matching including transformations such as removing prefixes and/or semantically unimportant characters such as hyphens and/or underlines, disregarding top-level domains, subdomains, directories and/or arguments in a destination, selecting destination(s) with relatively small edit distance(s) relative to the link destination, and/or other ways to perform approximate text matching known to those skilled in the art.

A destination menu including the actual destination and one or more alternate destinations may be presented (404). Examples of a menu include a pulldown menu such as the pulldown menu illustrated in FIG. 5, and an enumeration of selectable choices such as menu items associated with radio buttons. In some embodiments, a single alternate destination may be included in the menu. In some embodiments, multiple alternate destinations may be included in the menu, for example all within a predetermined closeness metric to the actual destination, or the N alternate destinations closest to the actual destination, such as two, three, four, or five. In some embodiments, the candidates may be randomly ordered. In some embodiments, the candidates may be canonically ordered, for example alphabetically or by recentness and/or frequency of use. An example of presenting a destination is to present the entire destination. Another example of presenting a destination is to present a portion of the destination, for example the name of a site, domain and/or subdomain stripped of extraneous information. In various embodiments, subdomains, arguments, embedded usernames and/or passwords, directory elements and/or page names may be considered extraneous for this purpose. A user may be allowed to select an intended destination from among the actual destination and one or more alternate destinations.

It may be determined whether the destination associated with the link has been selected (405). If it is determined that the destination associated with the link has been selected (405), then in this example a match is indicated (406). An example of indicating a match is to return a code to a caller indicating that the match occurred. If it is determined that the user has selected an alternate destination (405), then in this example a mismatch is indicated (407). An example of indicating a mismatch is to return a code to a caller indicating that the match did not occur. Another example of indicating a mismatch is to present a user interface element indicating that a mismatch has occurred, including one or more options which may include re-selecting an intended destination and/or cancelling navigation. In some embodiments, for example as discussed in conjunction with 304 of FIG. 3 or 804 of FIG. 8, a match may be associated with permitting navigation, and a mismatch may be associated with interfering with navigation.

Figure 5:
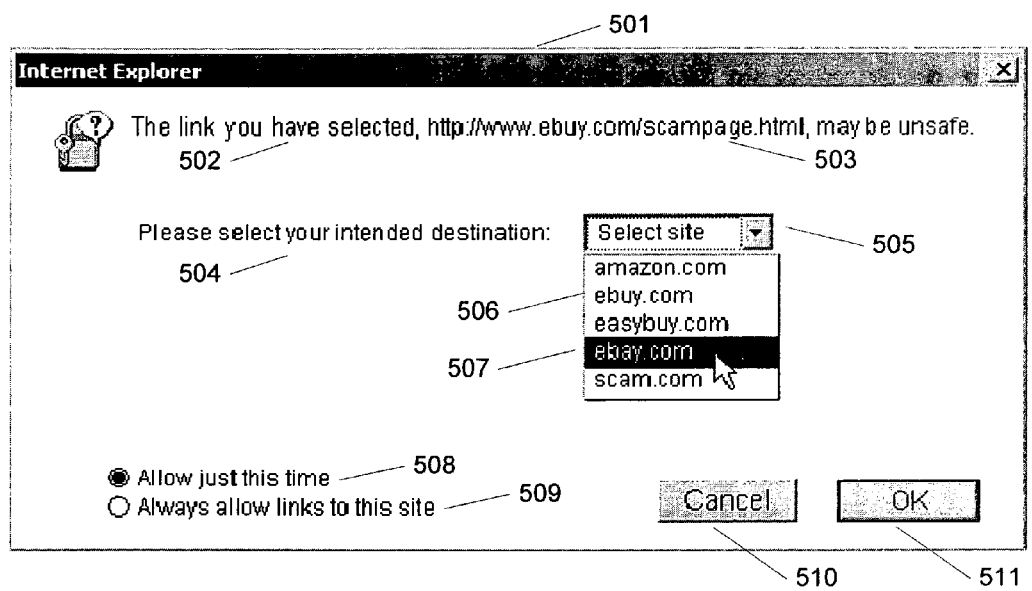
FIG. 5 is an illustrative example of a selection of an intended destination, according to some embodiments.

FIG. 5 is an illustrative example of a selection of an intended destination, according to some embodiments. In various embodiments, a user interface such as the user interface of this FIG. 5 may be displayed as described in conjunction with 3, 4 or 8. In this example, a user interface element such as a window 501 contains elements including one or more of a descriptive message 502, a destination characterization 503, a prompt 504, a selector 505, a destination associated with a link 506, one or more alternate destinations 507, options to allow one-time navigation 508 and to add a link destination to a whitelist 509, and actions to cancel 510 or navigate 511.

A descriptive message 502 may contain a description of the purpose of the user interface element. A destination characterization 503 may provide information relating to a link that is potentially being traversed, such as a characterization of the destination of that link.

A prompt 504 may request the user to perform an action to select an intended destination from two or more candidate destinations. Candidate destinations may include a destination associated with a link 506, and one or more alternate destinations 507 which are not associated with the link. Such destinations may be fully specified, or abbreviated or otherwise processed for display, such as by showing only domains and/or subdomains.

In some embodiments, options relating to navigation may be provided, such as an option to allow navigation just once 508 or to whitelist 509, which may in various embodiments whitelist a specific destination associated with the link, or whitelist an entire domain and/or subdomain(s) or other portion of a destination, such as a directory associated with a URL.

Navigation options may be provided, such as an option to cancel navigation 510 and/or an option to perform navigation 511.

Figure 6:
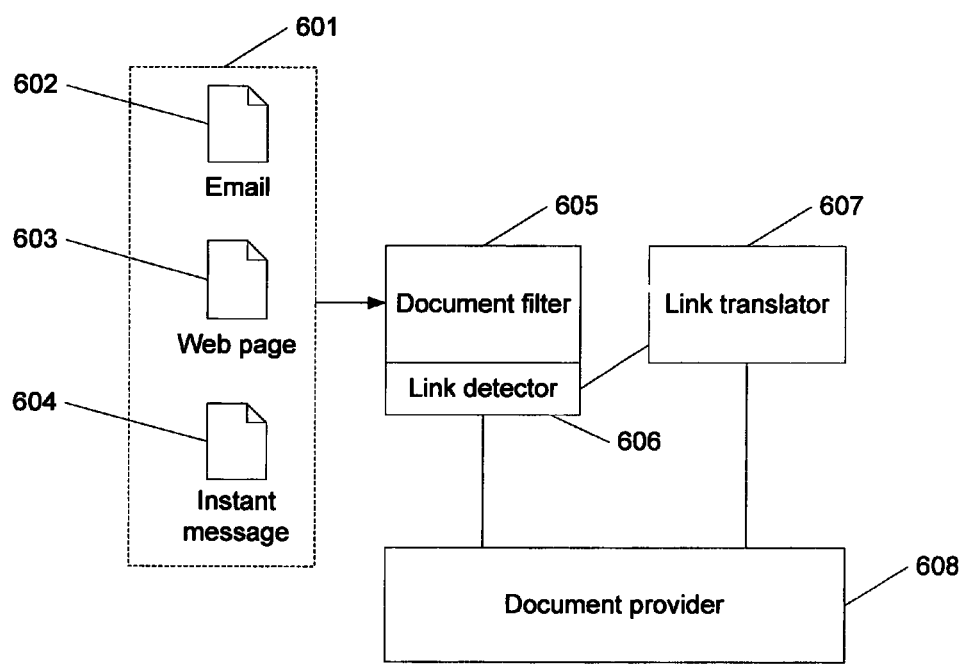
FIG. 6 is a diagram of a system for translating a link to a redirect, according to some embodiments.

FIG. 6 is a diagram of a system for translating a link to a redirect, according to some embodiments. In this example, a document 601, such as an email 9zx02, a web page 603, or an instant message 604, is an input to a document filter 605 incorporating a link detector 606, which detects one or more links associated with the document.

A link translator 607 may translate a link into a redirect, for example by creating a link associated with a predetermined destination, incorporating an argument associated with the original link destination. For example, a link of the form http://www.questionable.com might be translated into a link of the form http://www.processor.com/redirect?link= www.questionable.com.

A document provider 608 may provide a document with zero or more translated links, for example by storing the document or providing the document to a caller.

In some embodiments, the system of this FIG. 6 may be associated with a messaging server such as messaging server 104 of FIG. 1.

Further details of the operation of this FIG. 6 are discussed in conjunction with the remaining Figures.

Figure 7:
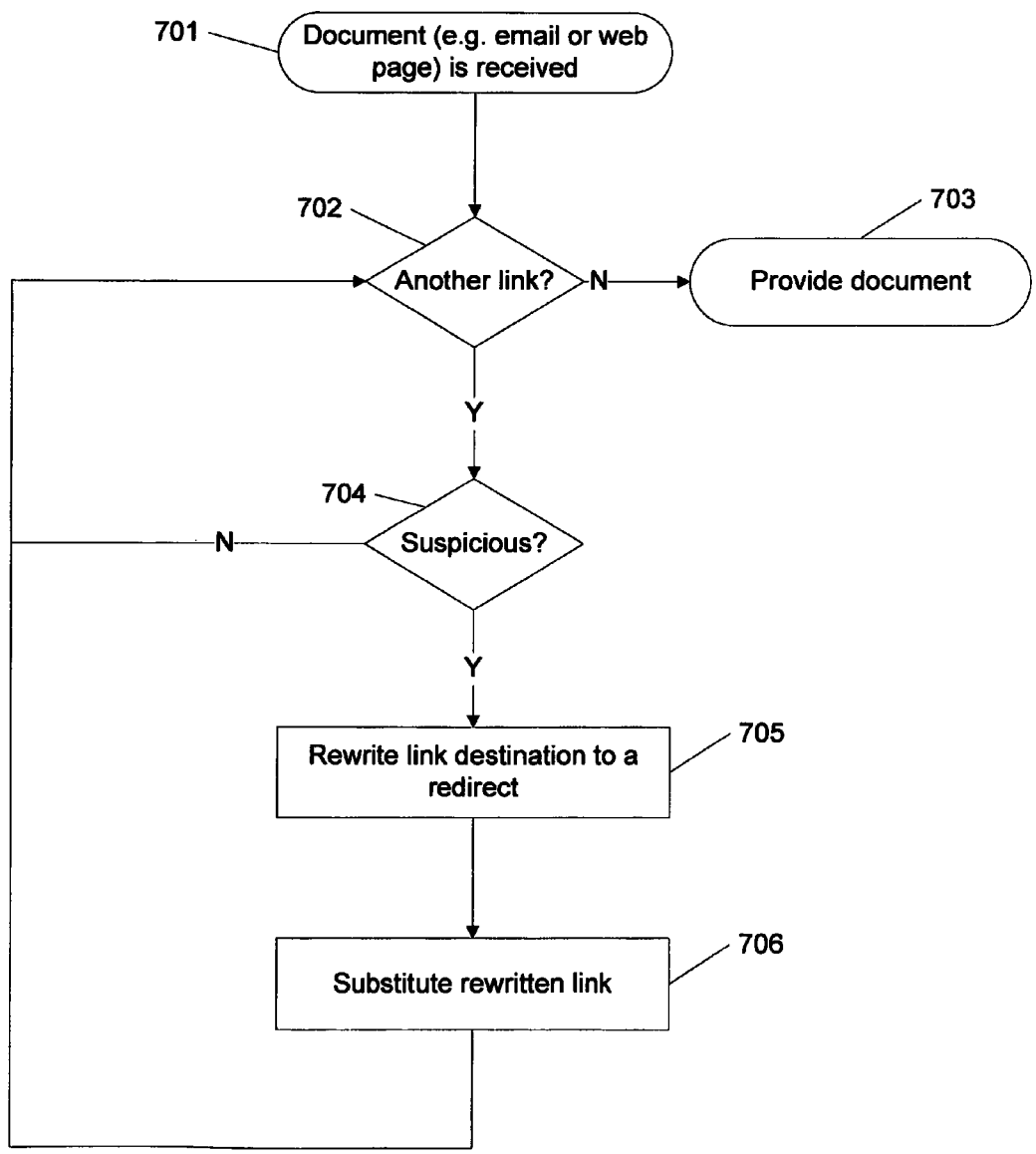
FIG. 7 is a flow diagram of a method for filtering a document, according to some embodiments.

FIG. 7 is a flow diagram of a method for filtering a document, according to some embodiments. In this example, a document is received (701). Examples of receiving a document include receiving a message such as an email at a messaging server such as messaging server 104 of FIG. 1 or at a user machine such as user machine 101 of FIG. 1; receiving a document such as a web page at a document browser; and opening a document stored on a disk or other storage.

It may be determined whether a link associated with the document remains to be processed (702). If it is determined that all links have been processed (702), then in this example the document is provided (703). An example of providing a document is to store the document, for example associated with a user's mail queue. Another example of providing a document is to pass it to a caller.

If it determined that a link remains to be processed (702), then in this example it is determined whether the next link is suspicious (704). Examples of determining suspiciousness of a link are described in conjunction with 302 of FIG. 3, and include determining that all links are suspicious.

If it is determined that the link is not suspicious (704), then in this example another link may be processed, if present (702). If it is determined that the link is suspicious (704), then in this example a destination associated with the link is rewritten to include a redirect (705).

An example of rewriting a link to include a redirect is to create a link whose base destination is predetermined, incorporating an argument associated with the original link destination. For example, a link of the form http://www.questionable.com, In which a predetermined destination is associated with http://www.processor.com, might be translated into a link of the form http://www.processor.com/redirect?link=www.questionable.com. In some embodiments, a predetermined base destination may be associated with a server such as a web server, for example a web server operated by an enterprise or by an external party over a network such as network 102 of FIG. 1.

The rewritten link may be substituted for the original link (706), for example by replacing the original link with the rewritten link within the document, or by writing the rewritten link into an incrementally constructed copy of the original document, containing one or more rewritten links. Another link may be processed, if present (702).

An illustrative example of an application of the technique of this FIG. 7 is to intercept an incoming email message, and rewrite links in the email to refer to a site that will ensure that any suspicious link destinations to which he or she would be navigating will be subject to verification.

Figure 8:
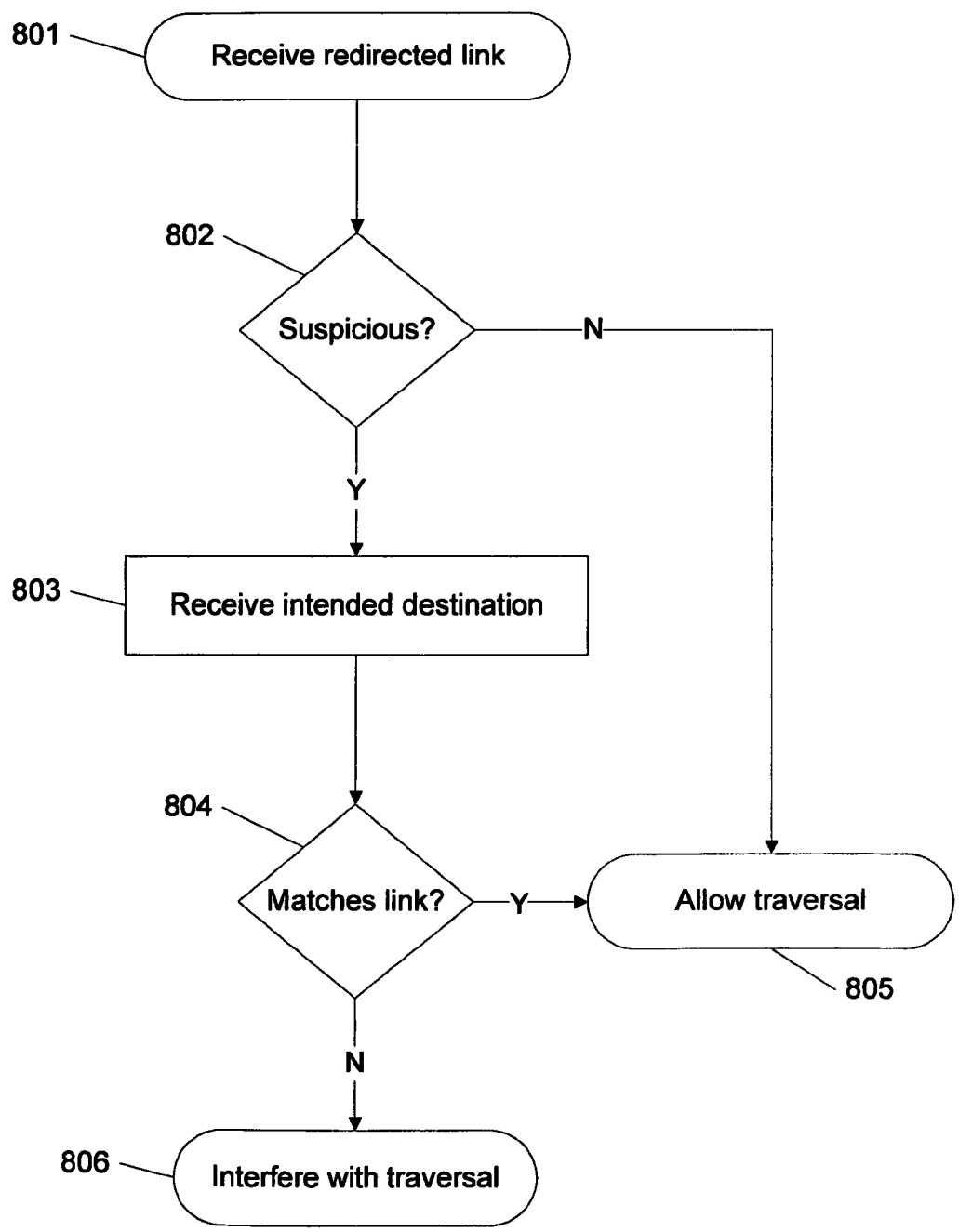
FIG. 8 is a flow diagram of a method for verifying navigation of a redirected link, according to some embodiments.

FIG. 8 is a flow diagram of a method for verifying navigation of a redirected link, according to some embodiments. In this example, a redirected link is received (801). An example of receiving a redirected link is to receive a request such as an HTTP request at a server such as a web server, which may in various embodiments be controlled by an enterprise, or by a third party. Such an HTTP request may include an original link destination, for example as an argument in a URL, such as an argument following a "?" or "&" in the URL, or for example as POST data in an HTTP request. In some embodiments, such a URL may have been constructed as described in conjunction with FIG. 7.

It may be determined whether the original link destination is suspicious (802). Examples of determining whether a link destination is suspicious are discussed in conjunction with 302 of FIG. 3.

If it is determined that the link is not suspicious (802), then in this example traversal to the original link destination is allowed (805). An example of allowing traversal to the original link destination is to redirect a web page to the original link destination.

If it is determined that the link is suspicious (802), then in this example an intended destination is received (803). Examples of receiving an intended destination are discussed in conjunction with 303 of FIG. 3, and FIG. 4.

It may be determined whether the intended destination matches the original link destination (804), for example as described in conjunction with 304 of FIG. 3. If it is determined that the intended destination matches the original link destination (804), then in this example traversal to the original link is allowed (805). If it is determined that the intended destination does not match the original link destination (804), then in this example traversal to the original link is interfered with (806). Examples of interfering with traversal are discussed in conjunction with 306 of FIG. 3.

An illustrative example of an application of the technique of this FIG. 8 is to receive a redirected link traversal from an email that has been processed as described in conjunction with FIG. 7, and ensure that a potentially suspicious link destination is subject to verification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for computer security, comprising:
   detecting an attempt of a traversal, wherein the attempt is associated with a link, wherein the link is associated with a link destination;
   verifying that navigation to the link destination is intended, wherein verifying that the link destination is intended includes:
      displaying a menu, wherein the menu enables selection from among a plurality of potential destinations, wherein the plurality of potential destinations includes a first candidate destination associated with the link destination and a second candidate destination associated with an alternate destination, wherein the alternate destination is different than the link destination;
      receiving an intended destination as a selection from among the plurality of potential destinations; and
      determining whether the intended destination is the first candidate destination; and
   interfering with the traversal, if it is determined that the intended destination is not the first candidate destination.

2. The method of claim 1, wherein the link is associated with email.

3. The method of claim 1, wherein the link is associated with a web page.

4. The method of claim 1, wherein detecting the attempt includes intercepting at least one of a navigation event and a user input event.

5. The method of claim 1, wherein detecting the attempt includes receiving a redirected navigation, wherein the redirected navigation is associated with a URL, and wherein the URL is associated with the link.

6. The method of claim 1, wherein receiving the intended destination includes receiving a user input.

7. The method of claim 1, wherein the second candidate destination is determined based on similarity to the first candidate destination.

8. The method of claim 1, further comprising determining that the link is suspicious.

9. The method of claim 8, wherein determining that the link is suspicious includes at least one of determining whether the link destination is associated with a blacklist, determining whether the link destination is associated with a whitelist, determining whether the link destination is associated with a previous navigation, determining whether the link is obfuscated, determining whether the link is associated with a second destination, wherein the second destination is different than the link destination, determining whether the link is associated with a document, wherein the document is determined to be suspicious, and determining whether the link destination is different from a third destination, wherein the third destination is associated with a second document and wherein the second document is associated with the link.

10. The method of claim 1, wherein the alternate destination is determined as a destination from among a plurality of previously visited destinations that is similar to the link destination.

11. The method of claim 1, wherein the alternate destination is determined as a destination from among a plurality of predetermined destinations that is similar to the link destination.

12. A computer-implemented method for computer security, comprising:
- receiving a document;
- detecting a link, wherein the link is associated with the document and with a destination site;
- determining that the link is suspicious, wherein determining that the link is suspicious includes at least one of determining that the link destination is associated with a blacklist, determining that the link destination is unassociated with a whitelist, determining that the link destination is unassociated with a previous navigation, determining that the link is obfuscated, determining that the link is associated with a second destination, wherein the second destination is different than the link destination, determining that the link is associated with a document, wherein the document is determined to be suspicious, and determining that the link destination is different from a third destination, wherein the third destination is associated with a second document and wherein the second document is associated with the link;
- determining a second link, wherein the second link is associated with a predetermined address and wherein the second link is associated with the link and with a verification site, wherein the verification site enables navigation to the destination site, subject to verification;
- rewriting the link, wherein rewriting the link includes providing the second link; and
- providing the document.

13. The method of claim 12, wherein the document is an email.

14. The method of claim 12, wherein the predetermined address is associated with redirection.

15. A computer program product for computer security, the computer program product being embodied in a non-transitory computer readable medium and comprising computer instructions for:
- detecting an attempt of a traversal, wherein the attempt is associated with a link, wherein the link is associated with a link destination;
- verifying that navigation to the link destination is intended, wherein verifying that the link destination is intended includes:
  - displaying a menu, wherein the menu enables selection from among a plurality of potential destinations, wherein the plurality of potential destinations includes a first candidate destination associated with the link destination and a second candidate destination associated with an alternate destination, wherein the alternate destination is different than the link destination;
  - receiving an intended destination as a selection from among the plurality of potential destinations; and
  - determining whether the intended destination is the first candidate destination; and
- interfering with the traversal, if it is determined that the intended destination is not the first candidate destination.

16. The computer program product of claim 15, wherein the link is associated with email.

17. The computer program product of claim 15, wherein detecting the attempt includes at least one of intercepting a navigation event, intercepting a user input event, and receiving a redirected navigation, wherein the redirected navigation is associated with a URL, and wherein the URL is associated with the link.

18. The computer program product of claim 15, further comprising computer instructions for determining that the link is suspicious.

19. The computer program product of claim 18, wherein determining that the link is suspicious includes at least one of determining that the link destination is associated with a blacklist, determining that the link destination is unassociated with a whitelist, determining that the link destination is unassociated with a previous navigation, determining that the link is obfuscated, determining that the link is associated with a second destination, wherein the second destination is different than the link destination, determining that the link is associated with a document, wherein the document is determined to be suspicious, and determining that the link destination is different from a third destination, wherein the third destination is associated with a second document and wherein the second document is associated with the link.

* * * * *